Oct. 31, 1967  R. K. CROMWELL  3,349,652
ALIGNMENT MEMBER FOR INSERT DRIVER TOOL
Filed May 24, 1966

INVENTOR
RICHARD K. CROMWELL
BY
Arch B Colvin
ATTORNEY

United States Patent Office 3,349,652
Patented Oct. 31, 1967

3,349,652
ALIGNMENT MEMBER FOR INSERT DRIVER TOOL
Richard K. Cromwell, Dover, N.J., assignor to Groov-Pin Corporation, Ridgefield, N.J., a corporation of New York
Filed May 24, 1966, Ser. No. 552,547
4 Claims. (Cl. 81—53)

This invention relates to an alignment member or jig for facilitating the accurate positioning of an insert member in a workpiece.

In United States Patent No. 2,817,987, there are disclosed various forms of driver tools for applying threaded insert members to workpieces. As is well known, such insert members comprise generally cylindrical internally and externally threaded units. Typically, an aperture is bored in the workpiece, the insert member is threadedly connected to a tool, such as is shown in the above noted patent, and the tool is rotated to cause the insert member to be embedded in the aperture formed in the workpiece.

In accordance with the above noted patent, a collar or nut engaging the insert being driven is backed off slightly, permitting the insert applying tool to be removed without danger of backing the insert member out of applied position in the workpiece.

Where the driver tool is manually supported, as is the case where installation of the inserts must be made in the field, if the insert is not accurately aligned with the aperture, it may be inserted at an angle and hence not be able properly to receive a fastening screw to be used in conjunction therewith.

With the foregoing in mind, it is an object of the present invention to provide a novel jig for accommodating a tool of the type described whereby accurate alignment of the tool and insert member with respect to an aperture is assured.

A further object of the present invention is the provision of an extremely simple and economically produced and yet effective jig for positioning elements for assuring the accurate application of an insert member.

Still a further object of the invention is the provision of an improved jig for accommodating a tool for applying an insert member, said jig being of particular value where the insert member is to be applied at or adjacent the square corner of a workpiece.

Still a further object of the invention is to provide an alignment member or jig for accommodating an insert driver tool in accordance with Patent No. 2,817,987, which jig greatly facilitates removal of the insert from the tool, without the necessity for removing the jig from its aligned position on the workpiece.

Reference will now be made to the accompanying drawings, forming a part hereof, in which.

Figure 1:
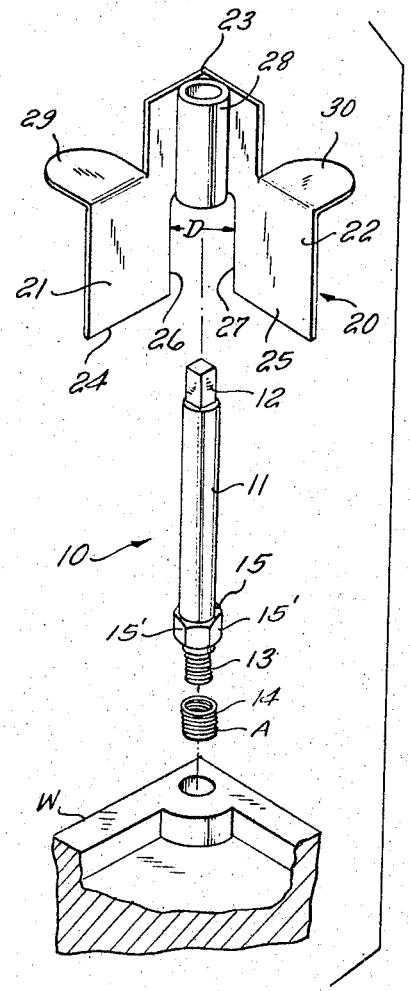
FIG. 1 is an exploded perspective view of a jig in accordance with the invention, showing the insert driver tool in position to be received in the chuck member.

In accordance with the invention, there is shown in FIG. 1 an insert driver tool 10 generally corresponding to the device shown in United States Patent No. 2,817,987, said driver tool including a cylindrical shank 11 having torque applying means 12 in the form of a squared section receivable within a driving device, such as a brace, socket, or chuck of a powerized driver member (not shown). The lower end 13 of the insert driver is threaded in the usual manner, to be received within the internally threaded bore of the insert 14.

To the shank 11 adjacent the threaded portion 13, there is rotatably mounted an insert abutment member 15 against which the upper edge of the insert 14 rests when the insert is being driven into the workpiece W. As more fully set out in the above noted patent, the insert is threaded tightly against the abutment member 15 and, after the insert is driven to the desired position, the driver member must be reversely rotated to unthread the insert member from the shank. In order to insure that the reverse rotation of the shank does not back the insert from the workpiece, the abutment member is prevented from rotating during the first partial reverse turn of the shank, as explained in said patent. As will be more fully set out in connection with the following description of the jig of the present invention, the jig is specially designed so that the desired counter-rotation of the shank relative to the abutment member, to release the insert, may be effected without the necessity for removing the jig from the workpiece.

The jig 20 includes leg members 21, 22 which are disposed at right angles to each other and are united at a common fold line 23. The undersurfaces 24, 25 of the leg members 21, 22 respectively, define co-planar foot portions. The opposed, inwardly directed walls 26, 27 of the leg members are spaced apart a distance D, which distance is sufficient to provide clearance for rotation of the abutment member 15 when the same is disposed adjacent the lower edges of the legs, as hereinafter set forth.

A cylindrical guide or bearing member 28 is secured, as by welding, between the leg members 21, 22, the axis of the guide being parallel to and spaced from the fold line 23 of the jig. It will be understood that the shank 11 of the driver tool is rotatable within the inner diameter of the guide member 28. The upper edges of the leg members 21, 22 are cut to define tabs 29, 30, which are bent at 90° with respect to the plane of the legs 21, 22 to provide a means for stabilizing the jig in the course of driving an insert member.

Figure 2:
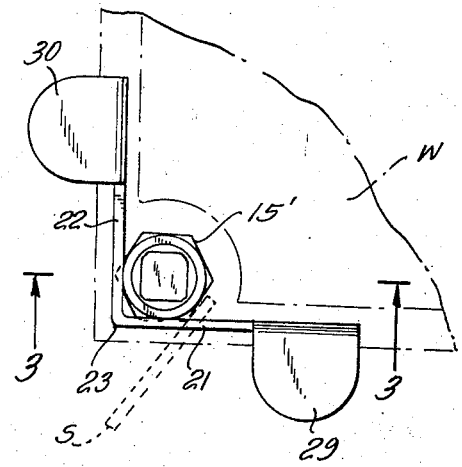
FIG. 2 is a plan view of the device in position for driving an insert member.
Figure 3:
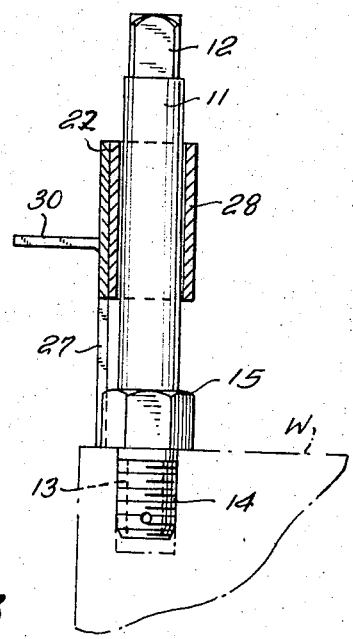
FIG. 3 is a section taken on line 3—3 of FIG. 2.

As best appreciated, from FIGS. 2 and 3, the device is utilized by first threading an insert 14 over the threaded portion 13 of the shank 11, the insert member being rotated until its upper edge abuts the undersurface of the abutment member 15. The end 12 of the driver tool 10 is then inserted upwardly through the inner diameter of the guide member 28. The jig device is disposed adjacent the receiving aperture A in the workpiece W so that the insert registers with the aperture, the foot portions 24, 25 bearing against the upper surface of the workpiece. The device is maintained in this position by a downward pressure on the stabilizing tabs 29, 30.

A torque member, such as a wrench or power tool, is next secured to the squared or key portion 12 of the driver device and the shank is clockwisely rotated in the usual manner, to thread the insert to a desired depth within the workpiece.

As noted in Patent No. 2,817,987, if the shank were merely reversely rotated there is considerable likelihood that the insert would be backed out of the workpiece rather than effecting the desired relative rotation between the shank and the insert. In order to achieve the relative rotation between the insert and shank, the abutment member 15 must be maintained stationary during the first fractional counterclockwise rotation of the driver.

As best shown in FIG. 2, this result is accomplished by inserting the blade of a tool, such as a screwdriver S, into the clearance space defined between one of the side walls 26, 27 of the leg members and one of the flattened gripping portions 15' of the abutment member. It will be observed that when the screwdriver blade S is positioned as shown in FIG. 2, counterclockwise rotation of the shank may be effected while blocking any counterclockwise rotary movement of the abutment member.

After the first partial rotation of the shank, the screwdriver blade may be removed and the shank rotated counterclockwise to leave the insert in the workpiece without any fear of dislodging the insert from the workpiece.

From the foregoing, it will be evident that there is provided by the present invention, an inexpensive yet highly effective jig for assuring that an insert is driven in a precisely oriented position with respect to the workpiece.

By reason of the right angular construction of the leg members, the device is particularly effective where an insert is to be driven at or adjacent a corner of a workpiece.

The construction of the jig, and particularly the provision of a clearance area adjacent the abutment member of the driver tool and the leg members of the jig for the insertion into said area of a rotation blocking tool, provide a particularly convenient means for releasing the driver tool from the insert.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A jig for an insert driver device of the type having a cylindrical shank with a threaded insert receiver at one end, said driver including an insert abutment member rotatably mounted on said shank adjacent said threaded portion and a torque transmitting member at the other end, said jig comprising a sheet metal body including a pair of leg members disposed at an angle with respect to each other, said leg members being joined at upper portions by a common fold line coincident with the plane of intersection of said members, the lower terminal edges of said member defining co-planar foot portions, the plane of said foot portions being normal to the planes of said leg members, the inner side walls of said leg members, adjacent the lower portions thereof, terminating a spaced distance outwardly of said fold line, thereby to define between said side walls a central clearance area in said body, cylindrical guide means fixed to said leg members inwardly of said fold line, the axis of said guide means being parallel with said fold line, the lower terminal end of said guide means being disposed a distance above said foot portions, said guide means forming a bearing for said shank of said insert driver.

2. A jig in accordance with claim 1 wherein said leg members are at right angles to each other and include outwardly bent tab portions for manually stabilizing said jig.

3. A device in accordance with claim 1 wherein said abutment member of said driver device is disposed adjacent said central clearance area when said shank is disposed within said guide means, said abutment member including flat side portions disposed in proximate spaced relation to said inner side walls as said shank is rotated in said guide means, whereby relative rotation between said shank and said abutment member may be prevented by inserting a tool into the space defined between a side portion of said abutment member and one of said side walls.

4. A jig in accordance with claim 3 wherein said leg members include outwardly bent tab portions disposed at right angles to said leg members and providing support portions for manually stabilizing said jig during application of an insert member.

References Cited

UNITED STATES PATENTS

| 1,394,004 | 10/1921 | Gould | 77—62 |
| 2,817,987 | 12/1957 | Boose | 81—53 |
| 2,835,978 | 5/1958 | Krisel | 77—62 X |
| 3,064,504 | 11/1962 | Jarboe | 77—62 |

JAMES L. JONES, JR., *Primary Examiner.*